United States Patent [19]

Kubo et al.

[11] Patent Number: 5,637,142
[45] Date of Patent: Jun. 10, 1997

[54] NONAQUEOUS EMULSIFIED SURFACE TREATING AGENT COMPOSITION

[75] Inventors: Motonobu Kubo; Masamichi Morita; Masayuki Yamana; Eiji Sakamoto; Ikuo Yamamoto, all of Settsu, Japan

[73] Assignee: Daikin Industries, Ltd., Osaka, Japan

[21] Appl. No.: 433,513

[22] PCT Filed: Nov. 9, 1993

[86] PCT No.: PCT/JP93/01621

§ 371 Date: May 11, 1995

§ 102(e) Date: May 11, 1995

[87] PCT Pub. No.: WO94/11456

PCT Pub. Date: May 26, 1994

[30] Foreign Application Priority Data

Nov. 13, 1992 [JP] Japan .................. 4-303625
Mar. 11, 1993 [JP] Japan .................. 5-050575

[51] Int. Cl.$^6$ ............... C09D 5/00; C09D 191/00
[52] U.S. Cl. ............... 106/285; 106/2; 106/14.41; 106/38.22; 106/287.23; 106/287.28; 252/8.62; 252/8.81; 428/375; 428/394; 428/395; 508/590; 508/587; 508/304; 508/489; 508/505; 508/577

[58] Field of Search .............. 106/2, 14.41, 38.22, 106/285, 287.28, 287.23, 287.24, 287.26; 252/58, 8.6, 8.9, 8.81, 52 R, 54, 8.62; 428/375, 392, 394, 395; 8/115.6

[56] References Cited

FOREIGN PATENT DOCUMENTS

| 52-106386 | 6/1977 | Japan . |
| 55-029501 | 3/1980 | Japan . |
| 58-59278 | 4/1983 | Japan . |
| 62-292713 | 12/1987 | Japan . |
| 63-2916 | 1/1988 | Japan . |
| 41064990 | 6/1992 | Japan . |

*Primary Examiner*—Anthony Green
*Attorney, Agent, or Firm*—Birch, Stewart, Kolasch & Birch, LLP

[57] ABSTRACT

A surface treating agent composition of fluorine-containing-oil-in-hydrocarbon-containing-oil type emulsion prepared by emulsifying a liquid fluorine-containing oil and a liquid hydrocarbon-containing oil by using a polymeric surfactant having a fluorine-containing segment and a hydrocarbon-containing segment in a molecule has excellent long-term stability.

21 Claims, No Drawings

NONAQUEOUS EMULSIFIED SURFACE TREATING AGENT COMPOSITION

BACKGROUND OF THE INVENTION

1. Field of the Invention

The present invention relates to a nonaqueous emulsified surface treating agent composition which comprises a fluorine-containing-oil-in-hydrocarbon-containing-oil emulsion (hereinafter referred to as F/H emulsion) containing a polymeric surfactant.

2. Related Art

Since a fluorine-containing oil such as a perfluoropolyether, a polychlorotrifluoroethylene and a fluorocarbon can provide a good lubricity and a high water- and oil-repellency, it is frequently diluted with a fluorine-containing solvent to be used as a surface treating agent. With the prohibition of a restricted fluorocarbon, it is desirable to use a hydrocarbon solvent as the solvent for the surface treating agent. But, the fluorine-containing oil does not dissolve or disperse in the hydrocarbon solvent. If an emulsion in which the hydrocarbon-containing oil is a continuous phase and the fluorine-containing oil is a dispersed phase, namely a F/H emulsion can be prepared, it can be dissolved with the hydrocarbon solvent so that it can be sufficiently used.

A conventional surfactant has a hydrophobic group (a hydrocarbon group, a fluorine-containing alkyl group and a silicone group) and a hydrophilic group in one molecule. The conventional surfactant is synthesized in view of the use in the aqueous phase having the objects that a surface tension of aqueous phase decreases and an interfacial tension between aqueous and oily phases decreases. When this type of surfactant is used to prepare the F/H emulsion, the surfactant is not effectively adsorbed by a hydrocarbon-containing oil/fluorine-containing oil interface so that a stable emulsion cannot be obtained, since the hydrophilic group in the molecule has no affinity for both of the hydrocarbon-containing oil and the fluorine-containing oil. The surfactant molecule must have a fluorine-containing compound group and a hydrocarbon compound group so that the surfactant is effectively adsorbed by the hydrocarbon-containing oil/fluorine-containing oil interface. Such a surfactant is herein referred to as "$R_f$-$R_h$ surfactant."

The preparation of the F/H emulsion using the $R_f$-$R_h$ surfactant was attempted in Japanese Patent Kokai Publication Nos. 292713/1987 and 2916/1988. However, a surfactant having low molecular weight perfluoroalkyl group and hydrocarbon alkyl group in the molecule is used, and the surfactant is adsorbed by the interface and gives an emulsion, but a stable emulsion can not be obtained. When the reason for this is studied in view of a principle of emulsion destruction, the following matters are believed to be the reasons. The main reason for emulsion destruction is an aggregation and cohesion. It is known that the aggregation is prevented by a static repulsion force or steric hinderance repulsion force of emulsion particle surface and the cohesion is prevented by the viscoelasticy of continuous phase/dispersed phase interfacial film. In the conventional F/H emulsion, the repulsion force among the particles is a steric hinderance force caused by the hydrocarbon alkyl group extending from the emulsion particle surface into the hydrocarbon-containing oil. Since the low molecular weight surfactants of the above patent publications have a short chain, the repulsion force among the particles caused by the steric hindrance force is weak. Since the surfactant itself has a low molecular weight, the interfacial viscoelasticy is low so that the cohesion among the particle easily occurs.

As stated above, none of the conventional F/H emulsions has sufficient long-term stability.

SUMMARY OF THE INVENTION

An object of the present invention is to provide an emulsion having excellent long-term stability and sufficient performances of surface treating agent.

According to one aspect, the present invention provides a surface treating agent composition comprising an emulsion prepared by emulsifying a liquid fluorine-containing oil and a liquid hydrocarbon-containing oil by using a polymeric surfactant having a fluorine-containing segment and a hydrocarbon-containing segment in a molecule.

According to another aspect, the present invention provides a surface treating agent composition comprising an emulsion prepared by emulsifying a liquid fluorine-containing oil and a liquid hydrocarbon-containing oil by using a polymeric surfactant prepared by the random copolymerization of a perfluoroalkyl group-containing polymerizable compound and a hydrocarbon-containing polymerizable compound.

In the emulsion (F/H emulsion), a weight ratio of the hydrocarbon-containing oil to fluorine-containing oil is usually from 95/5 to 5/95, preferably from 80/20 to 50/50.

The hydrocarbon-containing oil is a liquid at a room temperature and specific examples thereof are a hydrocarbon, a chlorine-containing solvent, an ester, a ketone, an ether, an alcohol and the like.

Specific examples of the hydrocarbon are n-hexane, n-heptane, n-octane, n-decane, n-dodecane, n-tetradecane, n-hexadecane, liquid paraffin, liquid polyisobutylene, toluene, xylene, benzene and the like. Specific examples of the chlorine-containing solvent are 1,1,2,2-tetrachloroethane, 1,1,1-trichloroethane, trichloroethylene, perchloroethylene and the like. Specific examples of the ester are isopropyl myristate, glyceryl triisooctanoate, cetyl isooctanoate, ethyl acetate, butyl acetate and the like. Specific examples of the ketone are methyl ethyl ketone, methyl isobutyl ketone, acetone and the like. Specific examples of the ether are diethyl ether, tetrahydrofuran and the like. Specific examples of the alcohol are methanol, ethanol, propanol and the like.

The fluorine-containing oil is a liquid at a room temperature and specific examples thereof are a fluorocarbon, a perfluoropolyether, polychlorotrifluoroethylene and the like. Specific examples of the fluorocarbon are perfluorodecalin, perfluoromethyldecalin, perfluorotributylamine, perfluoropropylamine, perfluorohexane, perfluorooctane and the like. The perfluoropolyether may be commercially available one and specific examples thereof are:

$F(CF(CF_3)CF_2O)_nCF_2CF_3$ (KRYTOX manufactured by Dupont), $CF_3O(CF(CF_3)CF_2)_n(CF_2O)_mCF_3$ (FOMBLIN Y manufactured by Montefluos), $CF_3O(CF_2CF_2O)_n(CF_2O)_mCF_3$ (FOMBLIN Z manufactured by Montefluos), $F(CF_2CF_2CF_2O)_nCF_2CF_3$ (DEMNUM manufactured by Daikin Industries Ltd.)

and the like. A number average molecular weight of the pefluoropolyether is preferably from 1,000 to 10,000 (measured by $^{19}$F-NMR).

The polychlorotrifluoroethylene may be a commercially available product and is, for example, $Cl-(CF_2CFCl)_n-Cl$ (DAIFLOYL manufactured by Daikin Industries Ltd.). A number average molecular weight of the polychlorotrifluoroethylene is preferably from 500 to 15,000 (measured by $^{19}$F-NMR).

The fluorine-containing oil may have a functional group at the molecular end. Specific examples of the functional group of the fluorine-containing oil are a hydroxyl group, a carboxyl group, an amino group, an ester group, an amide group and the like.

The polymeric $R_f$-$R_h$ surfactant may be a random copolymer, but is preferably a block polymer or graft polymer having a fluorine-containing segment and a hydrocarbon-containing segment. In the block polymer or graft polymer, the fluorine-containing segment comprises a perfluoropolyether group or a polymeric chain prepared by the polymerization of a polyfluoroalkyl group- or perfluoropolyether group-containing polymerizable compound, and the hydrocarbon-containing segment comprises a polymeric chain prepared by the polymerization of a hydrocarbon-containing polymerizable compound. The reason why the block polymer or graft polymer is preferable is that since the fluorine-containing segment and the hydrocarbon-containing segment are block segments, the action of each of the segments is clarified. Concretely, it is believed that the blocked hydrocarbon-containing segment causes the strong steric hindrance force among the fluorine-containing oil particles so as to prevent the aggregation of particles. It is also believed that since the adsorption to interface is increased, the strength of interface film is increased so as to prevent the cohesion of the particles. A stable F/H emulsion can be prepared in smaller amount of the block or graft polymer than the amount of the random copolymer.

When the polymeric $R_f$-$R_h$ surfactant is the block or graft polymer, the weight ratio of the fluorine-containing segment to the hydrocarbon-containing segment is from 95/5 to 5/95, preferably from 80/20 to 30/70. In the case of the random copolymer, the weight ratio of the perfluoroalkyl group-containing polymerizable compound to the hydrocarbon-containing polymerizable compound is from 95/5 to 5/95, preferably from 80/20 to 40/60.

Specific examples of the polyfluoroalkyl group- or perfluoropolyether group-containing polymerizable compound are the following vinyl monomers, a typical example of which is a polyfluoroalkyl group-containing (meth)acrylate:

$$R_f-SO_2-NR^2OCOCR^3=CH_2 \quad (1)$$

$$R_f-(CH_2)_nOCOCR^3=CH_2 \quad (2)$$

$$R_f-COO(CH_2)_nCR^3=CH_2 \quad (3)$$

$$R_f-CH_2OCOCR^3=CH_2 \quad (4)$$

$$R_f-CONR^2OCOCR^3=CH_2 \quad (5)$$

$$R_f-CH_2CHCH_2OCOCR^3=CH_2 \quad \text{(OH)} \quad (6)$$

$$R_f-CH_2CHCH_2OCOCR^3=CH_2 \quad \text{(OCOR}^3\text{)} \quad (7)$$

$$R_f-O-Ar-CH_2OCOCR^3=CH_2 \quad (8)$$

wherein $R_f$ is a polyfluoroalkyl group having 3 to 21 carbon atoms or a perfluoropolyether group having a number average molecular weight of 500 to 5,000 (measured by $^{19}$F-NMR), $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an arylene group which may has a substituent group, and n is an integer of 1 to 10. The perfluoropolyether group may be $$F(CF(CF_3)CF_2O)_nCF_2CF_2-$$

(wherein n is an integer of 3 to 30)

$$CF_3O(CF(CF_3)CF_2O)_n(CF_2O)_mCF_2-$$

(wherein n is an integer of 2 to 30 and m is an integer of 3 to 70)

$$CF_3O(CF_2CF_2O)_n(CF_2O)_mCF_2-$$

(wherein n is an integer of 2 to 40 and m is an integer of 4 to 70)

$$F(CF_2CF_2CF_2O)_nCF_2CF_2-$$

(wherein n is an integer of 3 to 30).

Specific examples of the polymerizable compound are $$CF_3(CF_2)_7(CH_2)OCOCH=CH_2$$

$$CF_3(CF_2)_6(CH_2)OCOC(CH_3)=CH_2$$

$$(CF_3)_2CF(CF_2)_6(CH_2)_2OCOCH=CH_2$$

$$CF_3(CF_2)_7(CH_2)_2OCOC(CH_3)=CH_2$$

$$CF_3(CF_2)_7(CH_2)_2OCOCH=CH_2$$

$$CF_3(CF_2)_7SO_2N(CH_3)(CH_2)_2OCOCH=CH_2$$

$$CF_3(CF_2)_7SO_2N(C_2H_5)(CH_2)_2OCOC(CH_3)=CH_2$$

$$(CF_3)_2CF(CF_2)_6CH_2CH(OCOCH_3)CH_2OCOC(CH_3)=CH_2$$

$$(CF_3)_2CF(CF_2)_6CH_2CH(OH)CH_2OCOCH=CH_2$$

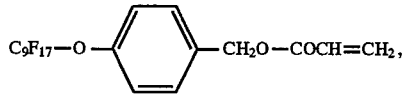

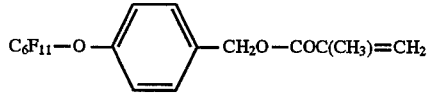

$$F(CF(CF_3)CF_2O)_{10}CF_2CF_2-COOCH_2CH_2CH=CH_2.$$

When the polymeric $R_f$-$R_h$ surfactant is the random copolymer, it preferable to use a long chain perfluoroalkylester having at least 8 carbon atoms.

Specific examples of the hydrocarbon-containing polymerizable compound are (1) acrylic acid and methacrylic acid, and methyl, ethyl, butyl, isobutyl, t-butyl, propyl, 2-ethylhexyl, hexyl, decyl, lauryl, stearyl, isobornyl, β-hydroxyethyl, glycidyl, phenyl, benzyl, and 4-cyanophenyl esters thereof; (2) a vinyl ester of a fatty acid such as acetic acid, propionic acid, caprylic acid, lauric acid and stearic acid; (3) a styrene compound such as styrene, α-methylstyrene and p-methylstyrene; (4) vinyl halides and vinylidene compounds such as vinyl fluoride, vinyl chloride, vinyl bromide, vinylidene fluoride and vinylidene chloride; (5) allyl esters such as allyl heptanoate, allyl caprylate, allyl caproate; (6) vinyl alkyl ketones such as vinyl methyl ketone and vinyl ethyl ketone; (7) acryl amides such as N-methylacrylamide and N-methylolmethacrylamide; (8) a diene such as 2,3-dichloro-1,3-butadiene and isoprene; and (9) dimethacrylates of polyethylene glycol.

When the polymeric $R_f$-$R_h$ surfactant is the random copolymer, it is preferable to use the long chain alkyl ester having at least 8 carbon atoms of acrylic acid or methacrylic acid.

The synthesis of the polymeric $R_f$-$R_h$ surfactant can be conducted in the following procedure.

The polymeric $R_f$-$R_h$ surfactant which is the block polymer can be synthesized in the following manner. When the fluorine-containing segment is the polyfluoroalkyl group- or perfluoroalkyl group-containing polymerizable compound, the synthesis method includes the process wherein a living polymer of a hydrocarbon (meth)acrylate is polymerized in the presence of a polymerization initiator (for example, aluminum porphyrin complex) and then a perfluoroalkyl group-containing (meth)acrylate is reacted therewith (cf. Japanese Patent Kokai Publication No. 120114/1992), and; a group transfer polymerization process [J. Am. Chem. Soc., 105, 5706 (1983), the disclosure of which is incorporated herein by reference]. The block polymer may be a commercially available product such as MODIPER F 600 (manufactured by Nippon Oil & Fats Company), and SURFLON S-381 and S-382 (manufactured by Asahi Glass Company).

When the fluorine-containing segment is the perfluoropolyether group, the synthesis method includes an iodine transfer polymerization process in which a hydrocarbon (meth)acrylate is polymerized together with a perfluoropolyether having an iodine atom at one molecular end [Kobunshi Ronbunshu, 49, 765 (1992)]; and a process in which methyl methacrylate is polymerized in the presence of an initiator (for example, perfluoro-oxa-alkanoylperoxide) and a perfluoropolyether group is introduced at both ends of polymethyl methacrylate chain.

The polymeric $R_f$-$R_h$ surfactant which is the graft polymer can be synthesized in the following manner. The synthesis method includes a process in which, by the use of the chain transfer procedure, a polymer radical initiation procedure, an initiation procedure using Ce (IV) or a polymer reaction procedure, a hydrocarbon-containing branch segment is grafted to a fluorine-containing trunk segment prepared by a conventional solution polymerization, emulsion polymerization and the like; and a process in which in the same procedure, a fluorine-containing branch segment is grafted to a hydrocarbon-containing trunk segment; a process in which a hydrocarbon-containing macromonomer is polymerized with a fluoromonomer or a fluorine-containing macromonomer is polymerized with a hydrocarbon-containing monomer in a usual solution polymerization, emulsion polymerization or the like; a process in which PFPE-COF and HOCH$_2$CH$_2$OCOCH=CH$_2$ are esterified; a process in which PFPE-CH$_2$OH and ClCOCH=CH$_2$ are esterified (wherein PFPE is a perfluoropolyether group). The graft polymer may be a commercially available product such as ALON GF-150 and GF-300 (manufactured by Toagosei Chemical Industries).

The polymeric $R_f$-$R_h$ surfactant which is the random copolymer can be synthesized by a usual solution polymerization or emulsion polymerization. It is preferable to use the emulsion polymerization. When the random polymer is used for the preparation of the F/H emulsion, the higher molecular weight gives the stable emulsion so that the emulsion polymerization is preferred to the solution polymerization.

The polymeric $R_f$-$R_h$ surfactant has the weight average molecular weight (measured by GPC) of usually 1,000 to 400,000, preferably 10,000 to 200,000.

Specific examples of the polymeric $R_f$-$R_h$ surfactant are as follows:

(1) In the case of the random copolymer,

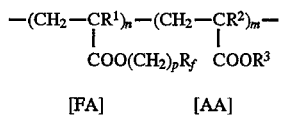

[FA]   [AA]

wherein $R_f$ is a polyfluoroalkyl group having 3 to 21 carbon atoms or a perfluoropolyether group having a number average molecular weight of 500 to 5,000, $R^1$ and $R^2$ each is a hydrogen atom or a methyl group, $R^3$ is a hydrocarbon alkyl group having 1 to 22 carbon atoms, p is from 1 to 10, n is from 1 to 99, m is from 1 to 99, and FA and AA are randomly polymerized.

(2) In the case of the graft copolymer,

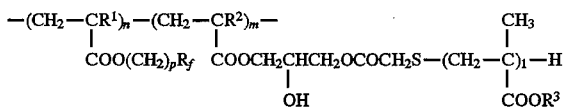

wherein $R_f$, $R^1$, $R^2$, $R^3$, p, n and m are the same as in the above, and l is from 10 to 500.

(3) In the case of the block copolymer,

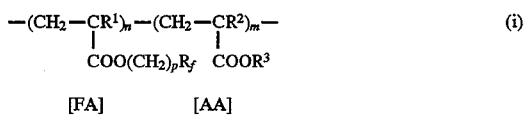 (i)

[FA]   [AA]

wherein $R_f$, $R^1$, $R^2$, $R^3$, p, n and m are the as in the above, and FA and AA are block polymerized.

 (ii)

wherein PFPE is a perfluoropolyether group having a number average molecular weight of 500 to 5,000 and $R^2$, $R^3$ and m are the same as in the above.

The above polymers (1), (2) and (3) are preferable in the view of the reactivity of monomer, the cost of monomer and the stability of emulsion.

Particularly, the polymers (2) and (3) are preferable in view of the stability of emulsion.

According to necessity, the polymeric $R_f$-$R_h$ surfactant can be used alone or in combination of at least two. A concentration of the polymeric $R_f$-$R_h$ surfactant is from 0.1 to 900 parts by weight, preferably from 1 to 800 parts by weight per 100 parts by weight of the fluorine-containing oil.

When the surface treating agent of the present invention is used as a textile treating agent, the higher concentration of the fluorine-containing oil improves and the abrasion resistance of the water- and oil-repellency and the feeling and the higher concentration of the polymeric $R_f$-$R_h$ surfactant improves the water- and oil-repellency.

The F/H emulsion can be prepared by dissolving the polymeric $R_f$-$R_h$ surfactant in the hydrocarbon-containing, then adding the fluorine-containing oil and emulsifying the mixture by an emulsifying apparatus (for example, a homomixer, a colloid mill, an ultrasonic homogenizer, a high pressure homogenizer and the like). The good F/H emulsion can be easily obtained by the use of an emulsifying apparatus giving the strong break energy such as an ultrasonic homogenizer and a high pressure homogenizer.

The surface treating agent composition of the present invention gives excellent water repellency, oil repellency, stain proof property, lubricity, electrical insulative property, and non-tackiness.

The surface treating agent composition of the present invention can be used as 1) a textile treating agent, 2) a stain proof or soil release agent, 3) an additive for car wax, 4) an additive for paint, 5) an additive for toiletry, 6) an additive for ink, 7) a mold release agent (non-tackiness agent), 8) an agent for preventing resin adhesion, 9) a rustproofing agent, 10) a cleaning agent for bearing, 11) an agent for treating back surface of tape, 12) a glazing agent, 13) an additive for lubricating oil, 14) a wax for skiing, 15) an additive for washing liquid of automobile, 16) a deodrant (for cooling box or refrigerator), 17) a de-icing agent, 18) an agent for treating wood (extermination of white ant), 19) an agent for preventing fog, 20) an agent for treating concrete surface, 21) a treating agent for preventing reflection, 22) an agent for treating ship bottom, 23) an additive for synthetic rubber, 24) an agent for cleaning fluorine-containing oil, 25) an additive for plating, 26) an anti-foam agent 27) a lubricant, 28) an agent for stretching wire and the like.

The surface treating agent composition of the present invention as such may be used as the surface treating agent. Alternatively, other surface treating agent (for example, a repellent such as a solution repellent) may be used together with the surface treating agent composition of the present invention. The solution repellent comprises a water- and oil-repellent component (for example, a water- and oil-repellent fluorine-containing copolymer), and an organic solvent. The water- and oil-repellent fluorine-containing copolymer contains, for example, polyfluoroalkyl (meth) acrylate/alkyl (meth)acrylate copolymer; or mixture thereof with a cross-linkable polymerizable compound. Specific examples of the organic solvent are a hydrocarbon-containing solvent and a chlorine-containing solvent such as n-decane, isopropanol, 1,1,2,2-tetrachloroethane, 1,1,1-trichloroethane, trichloroethylene and perchloroethylene. The weight ratio of the fluorine-containing oil in the surface treating agent composition to the water- and oil repellent component in the solution repellent is preferably from 10:90 to 90:10.

When the surface treating agent composition is used as the textile treating agent, a treated fiber includes an animal- or vegetable-origin natural fiber such as cotton, hemp, wool and silk: a synthetic fiber such as a polyamide, a polyester, polyvinyl alcohol, polyacrylonitrile, polyvinyl chloride and polypropylene; a semisynthetic fiber such as rayon and acetate: and a mixture of these fibers. The textile formed from the these fibers (for example, yarn and fabric) may be treated.

PREFERRED EMBODIMENT OF THE INVENTION

The present invention will be illustrated by the following Preparative Examples and Examples which do not limit the present invention.

The water repellency and the oil repellency are shown according to the following criteria. The water repellency is expressed by the water repellency No. (cf. the following Table 1) determined by the spray method according to JIS (Japanese Industrial Standard) L-1005. The oil repellency is determined by dropping several drops (diameter: about 4 mm) of a test solution shown in AATCC-TM118-1966 (Table 2) on two positions of a surface of a test cloth and observing the penetration state of the drops after 30 seconds. The superscript "+" or "−" to the water repellency No. and the oil repellency represents that the result is slightly better and slightly worse than said water repellency No. and said oil repellency, respectively.

A weight average molecular weight by GPC is converted to polystyrene.

TABLE 1

| Water repellency No. | State |
| --- | --- |
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

TABLE 2

| Oil repellency | Test solution | Surface tension (dyne/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 by weight) | 29.6 |
| 1 | Nujol | 31.2 |
| 0 | Inferior to 1 | — |

PREPARATIVE EXAMPLE 1

(Synthesis of grafted polymeric $R_f$-$R_h$ surfactant)

In a 200 ml four-necked flask equipped with a reflux condenser, a nitrogen introducing tube, a thermometer and a stirrer, 8 g of methyl methacrylate macromonomer (AA-6 manufactured by Toagosei Chemical Industries, a number average molecular weight: 6,000), 12 g of $CH_2$=CHCOO $(CH_2)_2C_8F_{17}$ (hereinafter referred to as "FA") and 180 g of 1,1,1-trichloroethane were charged and heated to 60° C. Then, the atmosphere in the flask was replaced with a nitrogen gas for 30 minutes. 1 g of t-butyl peroxypivalate (PERBUTYL PV manufactured by Nippon Oil & Fats Company) (hereinafter referred to as "PERBUTYL PV") was added and the polymerization was conducted for 6 hours. Methanol was added to the resultant reaction liquid to precipitate a polymer. The polymer was filtered and dried to give a grafted polymeric $R_f$-$R_h$ surfactant. A weight average molecular weight (measured by GPC): 30,000.

PREPARATIVE EXAMPLE 2

(Synthesis of grafted polymeric $R_f$-$R_h$ surfactant)

The same manner as in Preparative Example 1 was repeated to prepare a grafted polymeric $R_f$-$R_h$ surfactant, except that the stearyl methacrylate macromonomer (MM8-SMA manufactured by Toagosei Chemical Industries, A number average molecular weight: 9,000) was used instead of the methyl methacrylate macromonomer. A weight average molecular weight (measured by GPC): 25,000.

COMPARATIVE PREPARATIVE EXAMPLE 1

(Synthesis of low molecular weight $R_f$-$R_h$ surfactant)

In a 100 ml four-necked flask, 25.3 g (100 mmol) of 1-octadecene and 54.6 g (100 mmol) of $C_8F_{17}I$ were charged and heated to 60° C. The atmosphere in the flask was replaced with a nitrogen gas for 30 minutes. 0.5 g (3 mmol) of azobisisobutyronitrile (AIBN) was added and the reaction was conducted for 6 hours to prepare a low molecular weight $R_f$-$R_h$ surfactant. A molecular weight: 799.

EXAMPLE 1

40 g of 1,1,1-trichloroethane, 10 g of DEMNUM S-20 (perfluoropolyether manufactured by Daikin Industries, a molecular weight: 2,500) and 1 g of a surfactant prepared in Preparative Example 1 were treated with an ultrasonic homogenizer for 5 minutes to prepare an emulsion. The stability of the emulsion was evaluated. In the same manner, emulsions were prepared by the use of a polymeric $R_f$-$R_h$ surfactant prepared in Preparative Example 2, a blocked polymeric $R_f$-$R_h$ surfactant MODIPER F600 (manufactured by Nippon Oil & Fats Company) and a low molecular weight $R_f$-$R_h$ surfactant prepared in Comparative Example 1 and the stability of the emulsions was evaluated. The results are shown in Table 3.

TABLE 3

| Surfactant | Preparative Example 1 | Preparative Example 2 | MODIPER F600 | Comparative Preparative Example 1 |
|---|---|---|---|---|
| Remarks | Graft polymer | Graft polymer | Block polymer | Low molecular weight |
| Immediately after emulsification | ⊙⊙ | ⊙⊙ | ⊙⊙ | XX |
| After one month at 40° C. | ⊙⊙ | ⊙⊙ | ⊙⊙ | XX |

Note:
⊙⊙: Very good, ○: Good, Δ: Slightly bad state, X: Slight separation, XX: Full separation In a 100 ml four-necked flask, 13 g of FA, 6 g of stearyl acrylate, 1 g of glycidyl methacrylate and 80 g of 1,1,1-trichloroethane were charged and heated to 60° C. The atmosphere in the flask was replaced with a nitrogen gas for 30 minutes. 1 g of PERBUTYL PV was added and the polymerization was conducted for 6 hours to give a solution repellent. A gas chromatography analysis revealed that at least 99% of monomers were polymerized. In the following test, this solution repellent was used after diluting this solution repellent with n-decane to a solid content of 1% by weight.

A given amount of said emulsion prepared by the use of a surfactant of Preparative Example 1 was added to 500 g of the diluted liquid of the solution repellent to prepare a solution. A PET (tropical) fabric was immersed in the solution, dried in air, and dried at 100° C. for 3 minutes. The water-repellency, the oil-repellency and the feeing (sensual evaluation) were evaluated. The results are shown in Table 4.

TABLE 4

| Amount of emulsion (g) | Water-repellency/ oil-repellency | Feeling |
|---|---|---|
| 0 | 90/5 | Slightly hard |
| 10 | 90⁺/6 | Soft |
| 20 | 100/7 | Soft |
| 30 | 100⁺/8 | Soft |

EXAMPLE 2

A nylon (taffeta) fabric was immersed in a diluted liquid (solid content: 1% by weight) of solution repellent of Example 1, dried in air and cured at 160° C. for 3 minutes. On the other hand, an emulsion emulsified by the use of a $R_f$-$R_h$ surfactant (of Preparative Example 2) of Example 1 was diluted with n-decane to a solid content of 1% by weight, and the fabric treated with the repellent was immersed in the diluted liquid, was dried in air and was cured at 110° C. for 3 minutes, Initial water- and oil-repellency and the water- and oil-repellency after abrasion of the fabric treated by the two steps were evaluated. The abrasion was conducted by abrading the treated fabric with an abrading white cotton fabric wetted with water under a load of 2.5 kg in given times by the use of plain plane abrasion tester (manufactured by Yamaguchi Kagaku Sangyo Kabushi Kaisha). Once of abrasion is once of reciprocation (Rate: 1 reciprocation/second). The results are shown in Table 5.

TABLE 5

| | Water-repellency/ Oil-repellency | | | |
|---|---|---|---|---|
| Times of abrasion | 0 | 10 | 50 | 100 |
| Treatment with only solution repellent | 80/4 | 70/3 | 50/1 | 0/0 |
| Two-step treatment with solution repellent and F/H emulsion | 90/5 | 80⁺/5 | 80/4 | 80⁻/4 |

EXAMPLE 3

A given amount of the emulsion prepared by the use of the $R_f$-$R_h$ surfactant (Preparative Example 2) of Example 1 and 500 g of a solution in which the solution repellent of Example 1 was diluted with 1,1,1-trichloroethane to a solid content of 1% by weight were charged in a spray container. A treated fabric made of black polyester (tropical) was used and the liquid was sprayed on one point of the fabric for 5 seconds with a distance of 20 cm between the fabric and a spray nozzle. The state of the fabric dried in air was evaluated under the criteria shown in Table 6.

TABLE 6

| Whitening degree | Evaluation Criteria |
|---|---|
| 5 | No whitening |
| 4 | Unnoticeable whitening |
| 3 | Slight whitening |
| 2 | Considerable whitening |
| 1 | Remarkable whitening |

The results of the water- and oil-repellency and the whitening degree are shown in Table 7.

TABLE 7

| Amount of emulsion (g) | Water-repellency Oil-repellency | Whitening degree |
| --- | --- | --- |
| 0 | 80/4 | 1 |
| 10 | 80*/5 | 4 |
| 20 | 90/6 | 5 |
| 30 | 90/6 | 5 |

PREPARATIVE EXAMPLE 3

(Synthesis of random polymeric $R_f$-$R_h$ surfactant)

In a 200 ml four-necked flask, 8 g of methyl methacrylate (MMA), 12 g of FA and 180 g of 1,1,1-trichloroethane were charged and heated to 60° C. The atmosphere in the flask was replaced with a nitrogen gas for 30 minutes. 1 g of PERBUTYL PV was added and the polymerization was conducted for 6 hours. Methanol was added to the reaction liquid to precipitate a polymer. The polymer was filtered and dried to give a random polymeric $R_f$-$R_h$ surfactant. A weight average molecular weight (measured by GPC): 10,000.

PREPARATIVE EXAMPLE 4

(Synthesis of random polymeric $R_f$-$R_h$ surfactant)

Except that stearyl acrylate (StA) was used instead of MMA, the same manner as in Preparative Example 3 was repeated to prepare a random polymeric $R_f$-$R_h$ surfactant. A weight average molecular weight (measured by GPC): 15,000.

PREPARATIVE EXAMPLE 5

(Synthesis of random polymeric $R_f$-$R_h$ surfactant)

A mixture consisting of 40 g of methyl methacrylate (MMA), 60 g of FA, 130 g of ion exchanged water, 45 g of acetone, 0.1 g of n-laurylmercaptane, 1 g of stearyltrimethylammonium chloride and 2 g of polyoxyethyleneoctyl phenyl ether was heated to 60° C. and emulsified by a high pressure homogenizer. The resultant emulsion was charged in a 300 ml four-necked flask equipped with a reflux condenser, a nitrogen introducing tube, a thermometer and a stirrer and was kept at 60° C. for 1 hour under the nitrogen atmosphere. After intimately stirring, an aqueous solution of 0.5 g of azobisisobutylamidine diacetate in 5 g of water was added to initiate the polymerization. After the stirring at 60° C. for 3 hours, a MMA/FA copolymer latex was prepared. A gas chromatography analysis revealed that at least 99% of monomers were polymerized. Methanol was added to the latex to precipitate the copolymer which was separated and dried to give a polymeric $R_f$-$R_h$ surfactant. A weight average molecular weight (measured by GPC): 140,000.

PREPARATIVE EXAMPLE 6

(Synthesis of random polymeric $R_f$-$R_h$ surfactant)

A mixture consisting of 40 g of stearyl acrylate (StA), 60 g of FA, 130 g of ion exchanged water, 45 g of acetone, 0.1 g of n-laurylmercaptane, 1 g of stearyltrimethylammonium chloride and 2 g of polyoxyethyleneoctyl phenyl ether was heated to 60° C. and emulsified by a high pressure homogenizer. The resultant emulsion was charged in a 300 ml four-necked flask equipped with a reflux condenser, a nitrogen introducing tube, a thermometer and a stirrer and was kept at 60° C. for 1 hour under the nitrogen atmosphere. After intimately stirring, an aqueous solution of 0.5 g of azobisisobutylamidine diacetate salt in 5 g of water was added to initiate the polymerization. After the stirring at 60° C. for 3 hours, a StA/FA copolymer latex was prepared. A gas chromatography analysis revealed that at least 99% of monomers were polymerized. Methanol was added to the latex to precipitate the copolymer which was separated and dried to give a polymeric $R_f$-$R_h$ surfactant. A weight average molecular weight: 210,000.

EXAMPLE 4

40 g of 1,1,1-trichloroethane, 10 g of DEMNUM S-20 (perfluoropolyether manufactured by Daikin Industries, A molecular weight: 2,500) and 1 g of a $R_f$-$R_h$ surfactant prepared in Preparative Example 3 were treated by an ultrasonic homogenizer for 5 minutes to give an emulsion. The stability of the emulsion was evaluated. In the same manner, emulsions were prepared by the use of the $R_f$-$R_h$ surfactants prepared in Preparative Examples 4–6 and Comparative Example 1 and the stability thereof was evaluated. In addition, 40 g of 1,1,1-trichloroethane, 3 g of DEMNUM S-20 and 8 g of the $R_f$-$R_h$ surfactant prepared in Preparative Example 6 were treated by an ultrasonic homogenizer for 5 minutes to give an emulsion. The results of stability are shown in Table 8.

TABLE 8

| Surfactant | | Preparative Example 3 | Preparative Example 4 | Preparative Example 5 | Preparative Example 6 | Preparative Example 6 | Comparative Preparative Example 1 |
| --- | --- | --- | --- | --- | --- | --- | --- |
| | Polymerization method | Solution polymerization | Solution polymerization | Emulsion polymerization | Emulsion polymerization | Emulsion polymernation | Law molecular weight |
| | Composition of polymer | FA/MMA | FA/StA | FA/MMA | FA/StA | FA/StA | — |
| Weight ratio of surfactant/DEMNUM | | 1/10 | 1/10 | 1/10 | 1/10 | 8/3 | 1/10 |
| Immediately after emulsification | | ○ | ○ | ○○ | ○○ | ○○ | XX |
| After one month at 40° C. | | Δ | ○ | ○ | ○○ | ○○ | XX |

Note:
○○: Very good, ○: Good, Δ: Slightly bad state, X: Slight separation, XX: Full separation In a 100 ml four-necked flask, 10 of FA, 10 g of stearyl acrylate and 80 g of 1,1,1-trichloroethane were charged and heated to 60° C. The atmosphere in the flask was replaced with a nitrogen gas for 30 minutes. 1 g of PERBUTYL PV was added and the polymerization was conducted for 6 hours to give a solution repellent. A gas chromatography analysis revealed that at least 99% of monomers were polymerized. In the following test, this solution repellent was used after diluting the solution repellent with n-decane to a solid content of 1% by weight.

A given amount of said emulsion prepared by the use of a polymeric $R_f$-$R_h$ surfactant of Preparative Example 6 (the weight ratio of surfactant/DEMNUM S-20=1/10) was added to 500 g of the above diluted solution repellent. A PET (tropical) fabric was immersed in the solution, dried in air, and dried at 100° C. for 3 minutes. The water-repellency, the oil-repellency and the feeing (sensual evaluation) were evaluated. The results are shown in Table 9.

TABLE 9

| Amount of emulsion (g) | Water-repellency/ oil-repellency | Feeling |
|---|---|---|
| 0 | 80/4 | Slightly hard |
| 10 | 90+/6 | Soft |
| 20 | 100/7 | Soft |
| 30 | 100+/8 | Soft |

100 g (solid content: 21.6% by weight) of said emulsion prepared by the use of a polymeric $R_f$-$R_h$ surfactant of Preparative Example 6 (the weight ratio of surfactant/ DEMNUM S-20=1/10 or 8/3) was diluted with n-decane to a concentration of 1/21.6. A PET (tropical) fabric was immersed in the solution, dried in air, and dried at 100° C. for 3 minutes. The water-repellency, the oil-repellency and the feeing (sensual evaluation) were evaluated. The results are shown in Table 10.

TABLE 10

| Weight ratio of surfactant DEMNUM S-20 | Water-repellency oil-repellency | Feeling |
|---|---|---|
| 1/10 | 70/3 | Soft |
| 18/3 | 100/6 | Soft |

EXAMPLE 5

25 g of toluene, 10 g of DEMNUM S-20 (perfluoropolyether manufactured by Daikin Industries Ltd., A molecular weight: 2,500) and 0.1 g of a $R_f$-$R_h$ surfactant prepared in Preparative Example 1 were treated by an ultrasonic homogenizer for 5 minutes to give an emulsion. The stability of the emulsion was evaluated. In the same manner, emulsions were prepared by the use of the $R_f$-$R_h$ surfactants prepared in Preparative Examples 2, 5 and 6 and the stability thereof was evaluated. The results of stability are shown in Table 11.

TABLE 11

| | Preparative Example 1 | Preparative Example 5 | Preparative Example 2 | Preparative Example 6 |
|---|---|---|---|---|
| Composition of polymer | FA/AA-6 | FA/MMA | FA/MM8-SMA | FA/StA |
| Immediately after emulsification | OO | Δ | OO | O |
| After one month at 40° C. | O | XX | O | X |

Note:
OO: Very good, O: Good, Δ: Slightly bad state, X: Slight separation, XX: Full separation

PREPARATIVE EXAMPLE 7

(Synthesis of random polymeric $R_f$-$R_h$ surfactant)

In a 200 ml four-necked flask, 4.4 g of stearyl acrylate (StA), 0.2 g of polyethyleneglycol dimethacrylate, 10.4 g of $CH_2=CHCOO(CH_2)_2C_8F_{17}$(FA), 90 g of n-heptane and 90 g of ethyl acetate were charged and heated to 60° C. The atmosphere in the flask was replaced with a nitrogen gas for 30 minutes. 1 g of PERBUTYL PV was added and the polymerization was conducted for 6 hours. The solvent was distilled off to give a random polymeric $R_f$-$R_h$ surfactant. A weight average molecular weight (measured by GPC): 15,000.

EXAMPLE 6

40 g of 1,1,1-trichloroethane, 10 g of DEMNUM S-20 (perfluoropolyether manufactured by Daikin Industries Ltd., A molecular weight: 2,500) and 1 g of a surfactant prepared in Preparative Example 1 were treated by an ultrasonic homogenizer for 5 minutes to give an emulsion.

EXAMPLE 7

19.5 g of n-heptane, 1.75 g of ethyl acetate, 1.25 g of DEMNUM S-20 and 3.75 g of a surfactant prepared in Preparative Example 7 were treated by an ultrasonic homogenizer for 3 minutes to give an emulsion.

COMPARATIVE EXAMPLE 1

25 g of isooctane and 1.25 g of DEMNUM S-20 were treated by an ultrasonic homogenizer for 3 minutes to give an emulsion.

COMPARATIVE EXAMPLE 2

25 g of isooctane, 1.25 g of DEMNUM S-20 and 0.13 g of UNIDINE DS-101 (fluorine-containing surfactant manufactured by Daikin Industries Ltd.) were treated by an ultrasonic homogenizer for 3 minutes to give an emulsion.

The stability of each of the emulsions was evaluated. The results are shown in Table 12.

TABLE 12

|  | Example 6 | Example 7 | Comparative Example 1 | Comparative Example 2 |
| --- | --- | --- | --- | --- |
| Immediately after emulsification | O | O | X | X |
| After 1 hour at room temperature | O | O | X | X |
| After one month at 40° C. | O | O | X | X |
| Surfactant | Preparative Example 1 | Preparative Example 7 | — | UNIDINE DS-101 |
| Type | Polymeric graft polymer | Polymeric random polymer |  | Low molecular weight |

Note: State of emulsion O: Good, Δ: Slightly bad state, X: Slight separation

Then, the emulsions prepared in Examples 6 and 7 were evaluated. The evaluated items were 1) a coefficient of friction, 2) a contact angle, 3) a lubricating property and a rustproofing property, and 4) a mold release property. For the comparison, samples of Comparative Examples 3–7 were prepared.

COMPARATIVE EXAMPLE 3

1.25 g of DEMNUM S-20 was dissolved in 25 g of CFC-113 to prepare a solution.

COMPARATIVE EXAMPLE 4

1.25 g of PARAFFIN 155 (wax manufactured by Nihon Seiroh Kabushi Kaisha) was dissolved in 20 g of n-hexane to prepare a solution.

COMPARATIVE EXAMPLE 5

19.5 g of n-heptane, 1.75 g of ethyl acetate and 3.75 g of the surfactant prepared in Preparative Example 7 were treated by an ultrasonic homogenizer for 3 minutes to give an emulsion.

COMPARATIVE EXAMPLE 6

100 g of isooctane was used as a sample.

COMPARATIVE EXAMPLE 7

0.5 g of SANHIBITER No. 2-1 (rustproofing agent manufactured by Sanyo Chemical Industries Ltd.) was dissolved in 100 g of isooctane to prepare a solution.

Coefficient of Friction

Coefficient of friction was measured by the use of a tester for coefficient of friction (ETM-4S type manufactured by Toyo Kiki Company Ltd.). The results are shown in Table 13.

TABLE 13

|  | Example 6 | Example 7 | Comparative Example 4 | Comparative Example 5 |
| --- | --- | --- | --- | --- |
| Coefficient of friction | 0.21 | 0.22 | 0.43 | 0.70 |

Note:
Measurement condition: Test substrate material: Flexible vinyl chloride Temperature: 25° C.

Contact Angle

A contact angle was measured by the use of a contact angle meter (CA-A type manufactured by Kyowa Kaimen Kagaku Kabushiki Kaisha). The results are shown in Table 14.

TABLE 14

| Test solvent | Example 6 | Example 7 | Comparative Example 3 | Comparative Example 4 | Comparative Example 5 |
| --- | --- | --- | --- | --- | --- |
| Water | 113° | 112° | 102° | 104° | 111° |
| n-Hexadecane | 68° | 65° | 24° | —* | 64° |

Note:
Measurement condition: Test substrate material: Aluminum Temperature: 25° C.
*Measurement was impossible, since PARAFFIN 155 was dissolved in organic solvent Lubricating Property and Rustproofing Property When a fluorine-containing grease is applied to a bearing, the fluorine-containing grease has no compatibility with a pretreated rustproofing agent, and the application of the fluorine-containing as such gives a cause for a problem such as an unusual sound and an unusual abrasion. Therefore, the following treatment was conducted.

The commercially available bearing (not treated with a grease) treated with a rustproofing agent was immersed and shaken in isooctane for 3 minutes to remove the rustproofing agent. Then, the bearing was immersed in the sample of each of Examples 6 and 7 and Comparative Examples 6 and 7 for 3 minutes and dried in air. Then DEMNUM Grease L65 (manufactured by Daikin Industries Ltd.) was applied to the bearing, the rotation test is conducted under the conditions of 40° C. and 6,000 rpm to conduct the lubricating property test.

The rustproofing property test was conducted as follows. The bearing having the removal of rustproofing agent was immersed in the sample of each of Examples 6 and 7 and Comparative Examples 6 and 7 for 3 minutes and dried in air. The treated bearing was immersed in a wide-mouthed 100 ml polyethylene container containing 30 ml of 1% sodium chloride solution.

The results of the lubricating property and rustproofing property are shown in Table 15.

TABLE 15

|  | Example 6 | Example 7 | Comparative Example 6 | Comparative Example 7 |
| --- | --- | --- | --- | --- |
| Lubricating property | O | O | X | X |
| Rustproofing property | O | O | X | O |

Evaluation criteria: Lubricating property O: No unusual sound occurred after 24 hours X: Unusual sound occurred after 24 hours Rustproofing property O: No rust generated after 1 week X: Rust generated on whole surface after 1 week Mold Release Property A sample prepared in each of Examples 6 and 7 and Comparative Examples 1, 2, 3, 4 and 5 was used as an external mold release agent for the molding of an epoxy resin. The test procedure for the mold release property was as follows.

1. Composition of the Epoxy Resin for the Test

| | |
|---|---|
| EPIKOTE #828 (manufactured by Shell Chemical) | 100 pbw |
| Triethylenetetramine | 10 pbw |

2 Mold and Molding Condition

A mold release agent (which was diluted with water to a solid content of 1% by weight) was brush-coated on a steel mold and dried in air. The mold was a mold for disk which had a cavity having a size of 40 mm in diameter and 2 mm in thickness. A pin was mounted vertically in a center position to remove easily a molded article after the curing reaction. The above gradients of the epoxy resin were intimately mixed, charged in the mold, kept standing at a room temperature for 2 hours and heated at 100° C. for 1 hour to conduct the curing reaction. When the pin was pulled manually to remove a molded article (a disk) from the mold, the mold release performance was evaluated by the hand feeling at that time according to the following criteria.

5: The molded article can be removed substantially without a force
4: The molded article can be removed with a slight force
3: The molded article can be removed with a force
2: The molded article can hardly removed with a force
1: The molded article is adhered to the mold and cannot be removed with a force A mold release life was determined by coating the mold release agent on the mold once, then measuring the deterioration of mold release property without further coating the mold release agent. When the demolding could be made at the above criteria of at least 3, the molding was repeated without coating the mold release agent, and then the number of the mold release times of once before the above criteria of at most 2 was defined as the mold release life. The mold release property rapidly decreased near the mold release life and was substantially the same before this point. The mold release property shown in Table 16 is a determined value which is most frequently exhibited when thus examined.

The results of the mold release test are shown in Table 16.

TABLE 16

Performance as mold release agent

| No. | Surfactant | Solvent | Oil | Mold release performance at the first demolding | Life |
|---|---|---|---|---|---|
| Ex. 6 | Polymeric graft polymer | Trichloro-ethane | DEMNUM S-20 | 4 | 3 |
| Ex. 7 | Polymeric random polymer | n-Heptane/ ethyl acetate | DEMNUM S-20 | 4 | 3 |
| Com. Ex. 1 | — | Isooctane | DEMNUM S-20 | 2 | 1 |
| Com. Ex. 2 | Low molecular weight | Isooctane | DEMNUM S-20 | 3 | 2 |
| Com. Ex. 3 | — | CFCl13 | DEMNUM S-20 | 4 | 3 |
| Com. Ex. 4 | — | n-Hexane | PARAF-FIN 155 | 3 | 1 |
| Com. Ex. 5 | Polymeric random polymer | n-Heptane/ ethyl acetate | — | 3 | 1 |

EFFECT OF THE INVENTION

The use of the specified polymeric surfactant gives excellent F/H emulsion, even if the amount of the surfactant is small. The nonaqueous emulsion of the present invention has an excellent long-term stability and sufficient performances for a surface treating agent.

The steric hindrance force caused by the hydrocarbon-containing polymer extending from the particle surface of emulsion into hydrocarbon-containing oil gives a strong repulsion force among the particles and prevents the aggregation. The absorption of the polymer can give a very high interfacial viscoelasticy and can prevent cohesion among the particles. Since the free polymer (polymeric surfactant) which is not absorbed by the interface is dissolved in the hydrocarbon-containing oil which is a continuous phase of the F/H emulsion, a viscosity of the continuous phase increases so that the floating and sinking of the emulsified particles (fluorine-containing oil) are prevented.

What is claimed is:

1. A surface treating agent composition comprising: an emulsion of a liquid fluorine-containing oil, dispersed in a liquid hydrocarbon-containing oil and a polymeric surfactant having a fluorine-containing segment and a hydrocarbon-containing segment, wherein the hydrocarbon-containing oil to the fluorine-containing oil weight ratio is 95/5 to 5/95.

2. The surface treating agent composition according to claim 1, wherein the polymeric surfactant is a block or graft polymer.

3. The surface treating agent composition according to claim 1, wherein the fluorine-containing segment in the polymeric surfactant comprises (i) a polymeric chain prepared by polymerizing a polyfluoroalkyl group- or perfluoropolyether group-containing polymerizable compound, or (ii) a perfluoropolyether group.

4. The surface treating agent composition according to claim 1, wherein the hydrocarbon-containing segment in the polymeric surfactant comprises a polymeric chain prepared by polymerizing a hydrocarbon-containing polymerizable compound.

5. A surface treating agent composition comprising:
an emulsion of a liquid fluorine-containing oil in a liquid hydrocarbon-containing oil and a polymeric surfactant prepared by the random copolymerization of a polyfluoroalkyl group or perfluoropolyether group-containing polymerizable compound and a hydrocarbon-containing polymerizable compound, wherein the hydrocarbon-containing oil to the fluorine-containing oil weight ratio is 95/5 to 5/95.

6. A fiber which is treated with the surface treating agent composition according to anyone of claims 1 to 5.

7. The surface treating agent composition according to claim 1, wherein the liquid hydrocarbon-containing oil to fluorine-containing oil weight ratio is from 80/20 to 50/50.

8. The surface treating agent composition according to claim 1, wherein the liquid hydrocarbon-containing oil is selected from the group consisting of a hydrocarbon, a chlorine-containing solvent, an ester, a ketone, an ether and an alcohol.

9. The surface treating agent composition according to claim 1, wherein the liquid hydrocarbon-containing oil is selected from the group consisting of n-hexane, n-heptane, n-octane, n-decane, n-dodecane, n-tetradecane, n-hexadecane, liquid paraffin, liquid polyisobutylene, toluene, xylene, benzene, 1,1,2,2-tetrachloroethane, 1,1,1-trichloroethane, trichloroethylene, perchloroethylene, isopropyl myristate, glyceryl triisooctanoate, cetyl isooctanoate, ethyl acetate, butyl acetate, methyl ethyl ketone, methyl isobutyl ketone, acetone, diethyl ether, tetrahydrofuran, methanol, ethanol and propanol.

10. The surface treating agent composition according to claim 1, wherein the liquid fluorine-containing oil is selected from the group consisting of a fluorocarbon, a perfluoropolyether and polychlorotrifluoroethylene.

11. The surface treating agent composition according to claim 1, wherein the liquid fluorine-containing oil is a fluorocarbon selected from the group consisting of perfluorodecalin, perfluoromethyldecalin, perfluorotributylamine, perfluoropropylamine, perfluorohexane and perfluorooctane.

12. The surface treating agent composition according to claim 1, wherein the polymeric surfactant has a weight ratio of the fluorine-containing segment to the hydrocarbon-containing segment of from 80/20 to 30/70.

13. A fiber treated with the surface treating agent composition of claim 1 or 5, wherein the fiber is selected from the group consisting of cotton, hemp, wool, silk, polyamide, a polyester, polyvinyl alcohol, polyacrylonitrile, polyvinyl chloride, polypropylene, rayon, acetate and mixtures thereof.

14. The surface treating agent composition according to claim 3, wherein the fluorine-containing segment in the polymeric surfactant comprises a polymeric chain prepared by polymerizing a compound selected from the group consisting of:

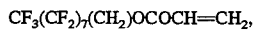

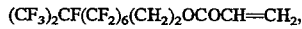

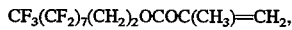

$CF_3(CF_2)_7(CH_2)_2OCOCH=CH_2$,

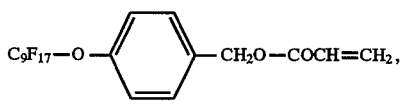

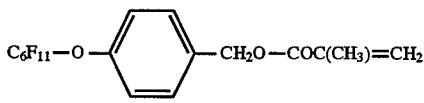

and

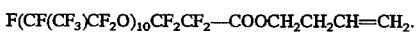

15. The surface treating agent composition according to claim 4, wherein the hydrocarbon-containing polymerizable compound is selected from the group consisting of acrylic acid, acrylic acid ester, methacrylic acid, methacrylic acid ester, a vinyl ester of a fatty acid, a styrene compound, a vinyl halide, a vinylidene compound, an allyl ester, a vinyl alkyl ketone, an acrylamide, a diene, and a dimethacrylate of polyethylene glycol.

16. The surface treating agent composition according to claim 1, wherein the polymeric surfactant is a random copolymer of the formula:

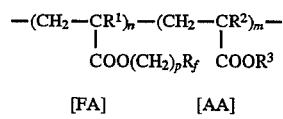

[FA]    [AA]

wherein $R_f$ is a polyfluoroalkyl group having 3 to 21 carbon atoms or a perfluoropolyether group having a number average molecular weight of 500–5,000;

$R^1$ and $R^2$ are each a hydrogen atom or a methyl group;

$R^3$ is a hydrocarbon alkyl group having 1 to 22 carbon atoms;

p is from 1 to 10;

n is from 1 to 99;

m is from 1 to 99; and

FA and AA are randomly polymerized.

17. The surface treating agent composition according to claim 1, wherein the polymeric surfactant is a graft copolymer of the formula:

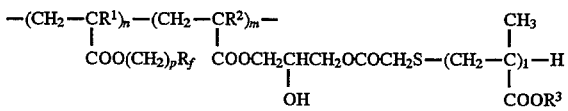

wherein $R_f$ is a polyfluoroalkyl group having 3 to 21 carbon atoms or a perfluoropolyether group having a number average molecular weight of 500–5,000;

$R^1$ and $R^2$ are each a hydrogen atom or a methyl group;

$R^3$ is a hydrocarbon alkyl group having 1 to 22 carbon atoms;

p is from 1 to 10;

n is from 1 to 99;

m is from 1 to 99; and l is from 10 to 500.

18. The surface treating agent composition according to claim 1, wherein the polymeric surfactant is a block copolymer of the formula:

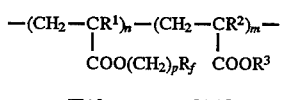

[FA]    [AA]

wherein $R_f$ is a polyfluoroalkyl group having 3 to 21 carbon atoms or a perfluoropolyether group having a number average molecular weight of 500–5,000;

$R^1$ and $R^2$ are each a hydrogen atom or a methyl group;

$R^3$ is a hydrocarbon alkyl group having 1 to 22 carbon atoms;

p is from 1 to 10;

n is from 1 to 99;

m is from 1 to 99; and

FA and AA are block polymerized.

19. The surface treating agent composition according to claim 1, wherein the polymeric surfactant is a block copolymer of the formula:

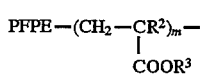

wherein PFPE is a perfluoropolyether group having a number average molecular weight of 500 to 5,000;

$R^2$ is hydrogen atom or a methyl group;

$R^3$ is a hydrocarbon alkyl group having 1 to 22 carbon atoms; and m is from 1 to 99.

20. The surface treating agent composition according to claim 1, wherein the polymeric surfactant has a weight average molecular weight of 1,000 to 400,000.

21. The surface treating agent composition according to claim 1, wherein the polymeric surfactant has a weight average molecular weight of 10,000 to 200,000.

* * * * *